United States Patent
Ding et al.

(10) Patent No.: US 11,470,027 B2
(45) Date of Patent: Oct. 11, 2022

(54) METHOD, APPARATUS, ELECTRONIC DEVICE AND STORAGE MEDIUM FOR BROADCASTING VOICE

(71) Applicant: Beijing Baidu Netcom Science and Technology Co., Ltd., Beijing (CN)

(72) Inventors: Shiqiang Ding, Beijing (CN); Jinyi Lei, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/212,061

(22) Filed: Mar. 25, 2021

(65) Prior Publication Data

US 2021/0211396 A1  Jul. 8, 2021

(30) Foreign Application Priority Data

Sep. 15, 2020  (CN) .......................... 202010969944.5

(51) Int. Cl.
| | |
|---|---|
| *G06F 15/16* | (2006.01) |
| *H04L 51/10* | (2022.01) |
| *G06F 16/638* | (2019.01) |
| *H04M 3/533* | (2006.01) |

(52) U.S. Cl.
CPC ............ *H04L 51/10* (2013.01); *G06F 16/638* (2019.01); *H04M 3/533* (2013.01)

(58) Field of Classification Search
CPC ....... H04L 51/10; G06F 16/638; H04M 3/533
See application file for complete search history.

(56) References Cited

U.S. PATENT DOCUMENTS

| | | | |
|---|---|---|---|
| 8,175,884 B1 * | 5/2012 | Morris ................... | G10L 15/26 704/270 |
| 10,027,662 B1 * | 7/2018 | Mutagi ............... | H04L 63/0861 |
| 2010/0017455 A1 * | 1/2010 | Svendsen .............. | H04W 4/029 709/202 |
| 2010/0063989 A1 * | 3/2010 | Mehta .............. | H04N 21/41407 709/202 |
| 2012/0184202 A1 * | 7/2012 | Gadoury ................ | H04H 20/38 455/3.06 |
| 2013/0006769 A1 * | 1/2013 | Schalk ............... | G06Q 30/0266 705/14.62 |
| 2017/0124406 A1 * | 5/2017 | Singh ................... | G06V 20/597 |
| 2020/0219140 A1 * | 7/2020 | Frankel ................. | G06Q 50/01 |
| 2021/0211396 A1 * | 7/2021 | Ding .................... | H04L 67/306 |

FOREIGN PATENT DOCUMENTS

JP          2018189682 A     11/2018

* cited by examiner

*Primary Examiner* — Oleg Survillo
(74) *Attorney, Agent, or Firm* — The Webb Law Firm

(57) ABSTRACT

A method, an apparatus, an electronic device and a storage medium for broadcasting a voice are provided. The method may include: sending a voice broadcast request to a server, where the voice broadcast request includes at least one of scenario information, user information or voice packet setting information; receiving a voice broadcast instruction corresponding to the voice broadcast request returned by the server; and acquiring a personalized voice packet corresponding to the voice broadcast instruction in a local database and broadcasting the personalized voice packet.

14 Claims, 5 Drawing Sheets

METHOD, APPARATUS, ELECTRONIC DEVICE AND STORAGE MEDIUM FOR BROADCASTING VOICE

CROSS-REFERENCE TO RELATED APPLICATION

This application claims priority to Chinese Patent Application No. 202010969944.5 filed Sep. 15, 2020, the disclosure of which is hereby incorporated by reference in its entirety.

BACKGROUND OF THE INVENTION

Field of the Invention

The present disclosure relates to the technical field of artificial intelligence, and in particular, to a voice broadcast technology, and more in particular, to a method, apparatus, electronic device and storage medium for broadcasting a voice.

Description of Related Art

With the development of voice technology, more and more fields have realized voice interaction, and text-to-voice methods are widely used in some scenarios that are not suitable for obtaining information through vision, for example, in scenarios of on-board navigation, text data can be converted into natural voices for output.

However, most of the map-type voice broadcast products in the target market are not personalized. Most of the voice broadcast products use the same copy or audio, and have not achieved the user-level personalized broadcast. In this case, the consistency of broadcast contents are not considered, and thus such broadcast systems can easily make users feel that the products are very rigid and not flexible enough.

SUMMARY OF THE INVENTION

Embodiments of the present disclosure provide a method, apparatus, electronic device and storage medium for broadcasting a voice, so that users can obtain consistent and personalized experiences in multiple scenarios, thereby improving the user satisfaction with voice broadcast.

In a first aspect, an embodiment of the present disclosure provides a method for broadcasting a voice, applied to a client, the method including:

sending a voice broadcast request to a server, where the voice broadcast request includes at least one of scenario information, user information or voice packet setting information;

receiving a voice broadcast instruction corresponding to the voice broadcast request returned by the server; and acquiring a personalized voice packet corresponding to the voice broadcast instruction in a local database and broadcasting the personalized voice packet.

In a second aspect, an embodiment of the present disclosure further provides a method for broadcasting the voice, applied to a server, the method including:

receiving a voice broadcast request sent by a client, where the voice broadcast request includes at least one of scenario information, user information or voice packet setting information; and returning a voice broadcast instruction corresponding to the voice broadcast request to the client based on the voice broadcast request, so that the client acquires a personalized voice packet corresponding to the voice broadcast instruction in a local database and broadcasts the personalized voice packet.

In a third aspect, an embodiment of the present disclosure provides an apparatus for broadcasting the voice, the apparatus including a request module, a first receiving module and a broadcast module.

The request module is configured to send a voice broadcast request to a server, where the voice broadcast request includes at least one of scenario information, user information or voice packet setting information.

The first receiving module is configured to receive a voice broadcast instruction corresponding to the voice broadcast request returned by the server.

The broadcast module is configured to acquire a personalized voice packet corresponding to the voice broadcast instruction in a local database and broadcast the personalized voice packet.

In a fourth aspect, an embodiment of the present disclosure further provides an apparatus for broadcasting the voice, the apparatus including a second receiving module and a broadcast control module.

The second receiving module is configured to receive a voice broadcast request sent by a client, where the voice broadcast request includes at least one of scenario information, user information or voice packet setting information.

The broadcast control module is configured to return a voice broadcast instruction corresponding to the voice broadcast request to the client based on the voice broadcast request, so that the client acquires a personalized voice packet corresponding to the voice broadcast instruction in a local database and broadcasts the personalized voice packet.

In a fifth aspect, an embodiment of the present disclosure provides an electronic device, including: one or more processors; and a storage device for storing one or more programs, where the one or more programs, when executed by the one or more processors, cause the one or more processors to implement the method for broadcasting the voice described in any of the embodiments of the present disclosure.

In a sixth aspect, an embodiment of the present disclosure provides a computer readable storage medium storing a computer program, where the computer program, when executed by a processor, implements the method for broadcasting the voice described in any of the embodiments of the present disclosure.

According to the embodiments of the present disclosure, the method, apparatus, electronic device and storage medium for broadcasting the voice are provided. The voice broadcast request is sent to the server, where the voice broadcast request includes at least one of the scenario information, the user information or the voice packet setting information, and the voice broadcast instruction corresponding to the voice broadcast request returned by the server is received, and the personalized voice packet corresponding to the voice broadcast instruction is acquired in the local database and the personalized voice packet is broadcast.

It should be appreciated that the content described in this section is not intended to identify the key or critical features of the embodiments of the present disclosure, nor is it intended to limit the scope of the present disclosure. The other features of the present disclosure will become easy to understand through the following description.

BRIEF DESCRIPTION OF THE DRAWINGS

The accompanying drawings are intended to provide a better understanding of the present disclosure and do not constitute a limitation to the present disclosure.

DESCRIPTION OF THE INVENTION

In order to make the purpose, technical solutions and advantages of the embodiments of the present disclosure clearer, the technical solutions in the embodiments of the present disclosure will be described clearly and completely in combination with the accompanying drawings in the embodiments of the present disclosure. Obviously, the described embodiments are some, rather than all of the embodiments of the present disclosure. Based on the embodiments of the present disclosure, all other embodiments obtained by those skilled in the art without creative effort shall fall within the scope of the present disclosure.

Embodiment 1

Figure 1:
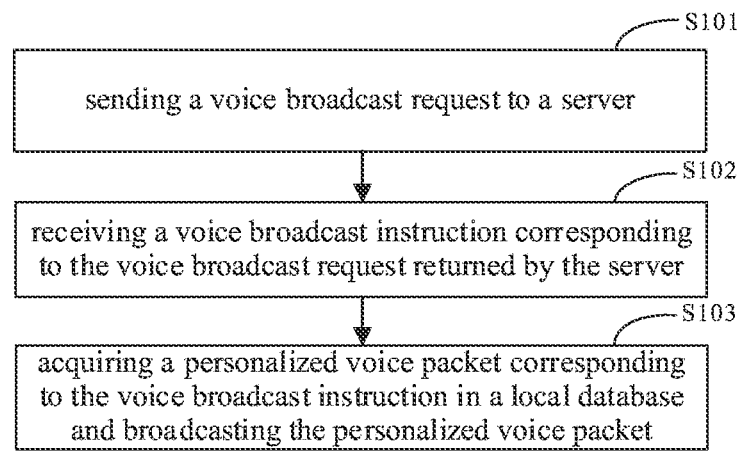
FIG. 1 is a first flowchart of a method for broadcasting a voice according to an embodiment of the present disclosure.

FIG. 1 is a first flowchart of a method for broadcasting a voice according to an embodiment of the present disclosure. This embodiment is applicable to a case in which a voice is broadcast in a scenario of intelligent voice broadcast. The method for broadcasting the voice according to this embodiment may be executed by an apparatus for broadcasting the voice or an electronic device according to an embodiment of the present disclosure, and the apparatus or the electronic device may be implemented in software and/or hardware, and may be integrated in a server and client executing the present disclosure. As shown in FIG. 1, the method of this embodiment includes, but is not limited to, the following steps S101 to S103.

S101 includes sending a voice broadcast request to a server.

In a specific embodiment of the present disclosure, the server may provide a voice broadcast service to a client, and the content of the service may include, for example providing resources to the client, saving client data and the like. The client is also known as a user, and corresponds to the server, which may control the client to perform personalized voice broadcast. In a scenario of intelligent voice broadcast, the client needs to process the current voice broadcast scenario information. Specifically, the client may first parse a related content, such as scenario information and user information that the current scenario needs to broadcast, then send the voice broadcast request to the server, where the voice broadcast request includes at least one of the scenario information, the user information or voice packet setting information.

S102 includes receiving a voice broadcast instruction corresponding to the voice broadcast request returned by the server.

In a specific embodiment of the present disclosure, the client may be a mobile phone, a tablet, a smart watch, a wearable device or the like. A user may install APP software having a voice broadcast function on the client. The APP software may include an APP front-end and an APP back-end. The APP front-end may provide a display for recording a voice by the user, and the APP back-end may include a text voice reading software development kit, a broadcast control module and a broadcast text access layer. In addition, the server may be provided with a module for generating a personalized voice packet, that is, a voice broadcast generation center, and the voice broadcast generation center may provide a personalized broadcast service for the client. After receiving the voice broadcast request sent by the client, the server may return the voice broadcast instruction corresponding to the voice broadcast request to the client, and the APP back-end receives the voice broadcast instruction. The voice broadcast instruction may include personalized voice packet information, such as voice packet audio ID or text information.

S103 includes acquiring a personalized voice packet corresponding to the voice broadcast instruction in a local database and broadcasting the personalized voice packet.

In a specific embodiment of the present disclosure, the local database is used to store the personalized voice packet. The client may acquire the voice broadcast instruction from the voice broadcast generation center of the server, download the personalized voice packet corresponding to the acquired voice broadcast instruction at a voice packet information storage center, and broadcast the personalized voice packet using a corresponding copy or audio in the personalized voice packet. For example, in a scenario of voice broadcast of driving navigation software, an APP may initiate a navigation service, access the voice broadcast generation center through the broadcast control module of the APP, and acquire a personalized voice packet related to the navigation service.

Alternatively, the client may further be responsible for tasks related to exception handling, such as broadcast exception detection, broadcast exception handling, broadcast exception tolerance and voice packet content update. For example, the client receives the voice broadcast instruction from the voice broadcast generation center, and the client first detects whether an audio ID in the voice broadcast instruction exists in the local database. If yes, the client acquires an audio corresponding to the audio ID based on the audio ID, and finally performs personalized broadcast.

According to the technical solution of this embodiment, by parsing the scenario information, user information and voice packet setting information of the current scenario, the personalized voice packet corresponding to the voice broadcast instruction is acquired, and the personalized voice packet is broadcast. This embodiment solves the problem that the broadcast system in the existing technology uses the same copy or audio, which easily makes users feel that the products are very rigid and not flexible enough and causes poor user experiences, so that the users can obtain consistent and personalized experiences in multiple scenarios, thereby improving the user satisfaction with voice broadcast.

Embodiment 2

Figure 2:
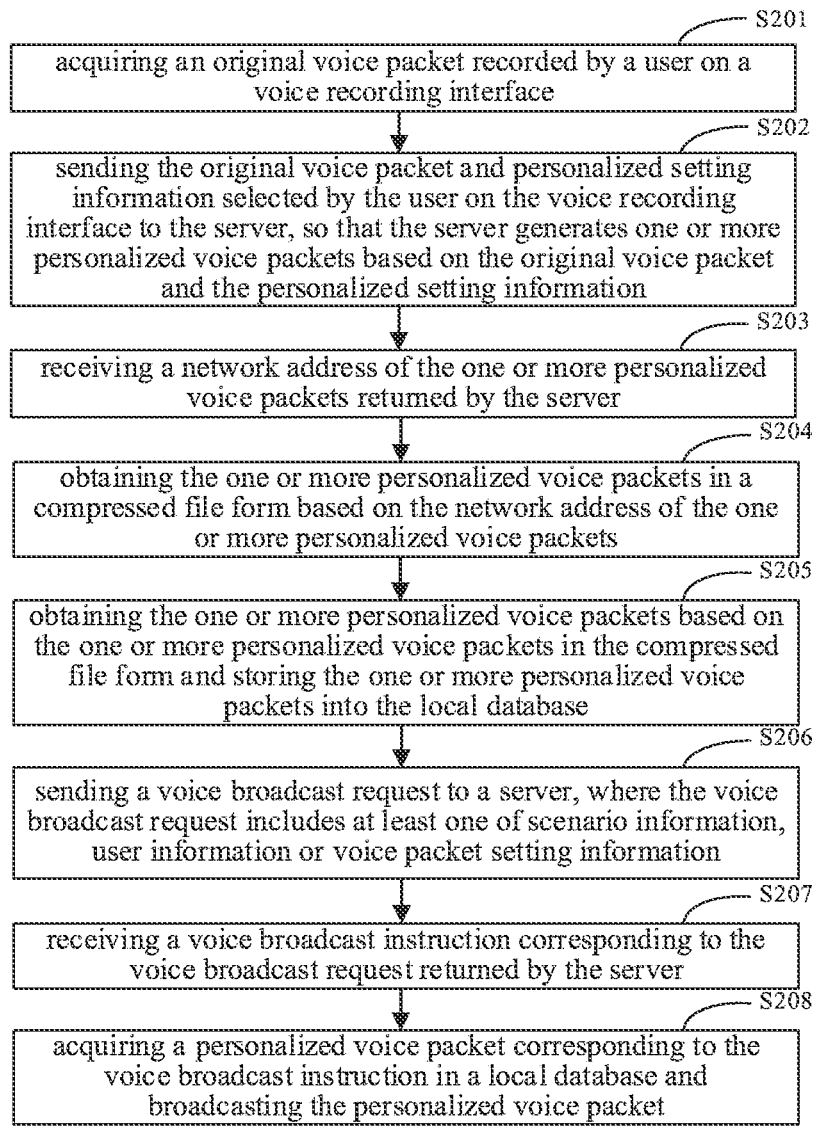
FIG. 2 is a second flowchart of the method for broadcasting the voice according to an embodiment of the present disclosure.

FIG. 2 is a second flowchart of the method for broadcasting the voice according to an embodiment of the present disclosure. On the basis of the previous embodiment, this embodiment further adds original voice packet recording and information storage. Alternatively, this embodiment will explain the process of the voice broadcast in detail. As shown in FIG. 2, the method of this embodiment includes, but is not limited to, the following steps S201 to S208.

S201 includes acquiring an original voice packet recorded by a user on a voice recording interface.

In a specific embodiment of the present disclosure, the original voice packet refers to the basic information of the voice packet, such as version information of the voice packet, generation time information of the voice packet, text information of the voice packet and voice information of the voice packet. The client may provide the user with the voice recording interface on the APP front-end, and the interface may have multiple selected or personalized options, such as scenario selection, title selection, style selection, script selection and voice recording. On the voice recording interface, the user may select a scenario in which a voice packet generated by recording takes effect, a style and title of voice broadcast, record his own audio or text, and enable the audio or text to take effect in a specified scenario according to the personal preference. For example, when a user reaches a cafe, the positioning device of the client may detect the location information of the user, and then send the location information to the server by carrying the location information in the voice broadcast request. The server may send the voice broadcast instruction corresponding to the location information to the client, and then the client acquires a prompt voice (for example: drink less coffee and take a break) corresponding to the location information in the local database based on the voice broadcast instruction.

Preferably, the client may select different broadcast contents according to various information, such as personal preferences and current scenario information. For example, the user sets the style in which the current voice packet takes effect to be playful, and the current navigation scenario is congestion. In this case, the corresponding broadcast content "The congestion is really not because of an accident ahead" is recalled according to the style and the scenario information. Targeted broadcast content push of operational or commercial activities is also supported.

S202 includes sending the original voice packet and personalized setting information selected by the user on the voice recording interface to the server, so that the server generates one or more personalized voice packets based on the original voice packet and the personalized setting information.

In a specific embodiment of the present disclosure, the user may set some personalized setting information on the voice recording interface, and the personalized setting information may include at least one of an effective scene, a broadcast style or a broadcast title. The client sends the original voice packet and the personalized information selected by the user on the voice recording interface to the server. The server may then pack the original voice packet and the personalized setting information into a voice packet according to the information selected or set by the user, and generate one or more personalized voice packets for downloading by the user. Alternatively, the voice packets may be in a compressed file form, or may be in an uncompressed file form.

S203 includes receiving a network address of the one or more personalized voice packets returned by the server.

In a specific embodiment of the present disclosure, the client sends the voice broadcast request to the server, where the voice broadcast request includes at least one of the scenario information, the user information or the voice packet setting information. The server sends the network address of the one or more personalized voice packets to the client in response to the voice broadcast request of the client. The client may then obtain the one or more personalized voice packets in the compressed file form based on the network address of the one or more personalized voice packets returned by the server. The one or more personalized voice packets are obtained based on the one or more personalized voice packets in the compressed file form. The one or more personalized voice packets are saved into the local database.

S204 includes obtaining the one or more personalized voice packets in a compressed file form based on the network address of the one or more personalized voice packets.

In a specific embodiment of the present disclosure, the client downloads the one or more personalized voice packets in the compressed file form at the server based on the network address of the one or more personalized voice packets.

S205 includes obtaining the one or more personalized voice packets based on the one or more personalized voice packets in the compressed file form and storing the one or more personalized voice packets into the local database.

In a specific embodiment of the present disclosure, the client may store the one or more personalized voice packets into the local database based on the download operation of the user for the one or more personalized voice packets in the compressed file form. After the user downloads the local database, the broadcast control module of the APP performs the personalized broadcast using the information in the voice packets. Alternatively, in addition to packaging and storing the voice packets into the local database, the voice packets may be stored into a cloud space for cloud backup.

S206 includes sending the voice broadcast request to a server, where the voice broadcast request includes at least one of the scenario information, the user information or the voice packet setting information.

S207 includes receiving a voice broadcast instruction corresponding to the voice broadcast request returned by the server.

S208 includes acquiring a personalized voice packet corresponding to the voice broadcast instruction in the local database and broadcasting the personalized voice packet.

Figure 3:
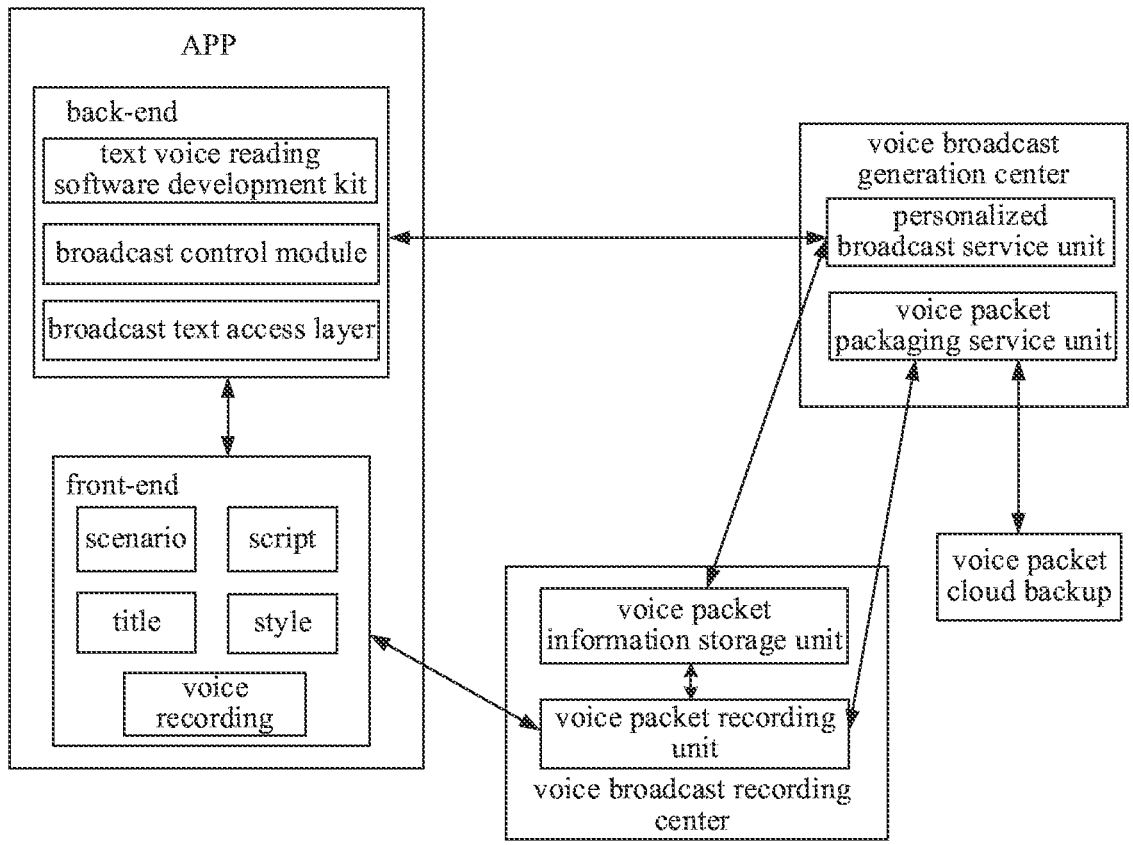
FIG. 3 is a frame structure diagram of a voice broadcast system according to an embodiment of the present disclosure.

FIG. 3 is a frame structure diagram of a voice broadcast system according to an embodiment of the present disclosure. This embodiment of the present disclosure is based on the previous embodiment, and an overall frame diagram of the voice broadcast system is explained in detail.

The technical solution of this embodiment is mainly based on a personalized voice packet recorded by a user. The core architecture of the system mainly includes three sub-modules: a voice broadcast recording center, a voice broadcast generation center and an APP. As shown in FIG. 3, the overall frame of the voice broadcast system is as follows. The voice broadcast recording center and the APP are sub-modules in the client. The voice broadcast generation center is a sub-module in the server. The voice packet recording center is composed of a voice packet information storage unit and a voice packet recording unit. The voice broadcast generation center is composed of a personalized broadcast service unit and a voice packet packaging service unit. The voice broadcast generation center provides personalized voice broadcast services for the voice broadcast recording center and the APP.

In a specific embodiment of the present disclosure, APP software having a voice broadcast function is installed on the client, where the APP software includes an APP front-end and an APP back-end. The APP front-end includes options, such as scenario, title, style, script or voice recording. The APP back-end includes a text voice reading software development kit, a broadcast control module and a broadcast text access layer.

In a specific embodiment of the present disclosure, the interaction flow of the voice broadcast between the voice broadcast recording center, the voice broadcast generation center and the APP is as follows. A personalized voice packet front-end recording interface is generated on the APP, and the interface may include personalized options, such as scenario selection, title selection, style selection, script selection and voice recording. In the personalized voice packet front-end recording interface, a user may select a scenario in which a voice packet generated by recording takes effect, a style and title of voice broadcast, record his own audio or text, and enable the audio or text to take effect in a specified scenario according to the personal preference. The client may then send the original voice packet and the personalized setting information selected by the user on the voice recording interface to the server, so that the server generates the one or more personalized voice packets based on the original voice packet and the personalized setting information. When the user is in a predetermined scenario, the client sends a voice broadcast request to the server, and the server then sends the network address of the personalized voice packet to the client in response to the voice broadcast request sent by the client, and the client may receive the network address of the personalized voice packet returned by the server, download the personalized voice packet in the compressed file form at the server based on the network address, obtain the personalized voice packet, and save the personalized voice packet into the local database. Preferably, the server may also send the personalized voice packet to a cloud space for storage and backup.

For example, when the user initiates a navigation or search request on the APP, the client may access the voice broadcast generation center through the broadcast control module of the APP, acquire a personalized voice packet related to the navigation service, and broadcast the personalized voice packet using a corresponding copy or audio in the personalized voice packet.

According to the technical solution provided in this embodiment, the generation and storage problems of personalized voice packets is solved by recording and generating voice packet services and storing voice packet information through some personalized information set on the voice recording interface, such as an effective scene, a broadcast style or a broadcast title, thereby realizing that the voice broadcast is more in line with the habits and styles of a user, thereby improving the stickiness of the user for products having a voice broadcast function.

Embodiment 3

Figure 4:
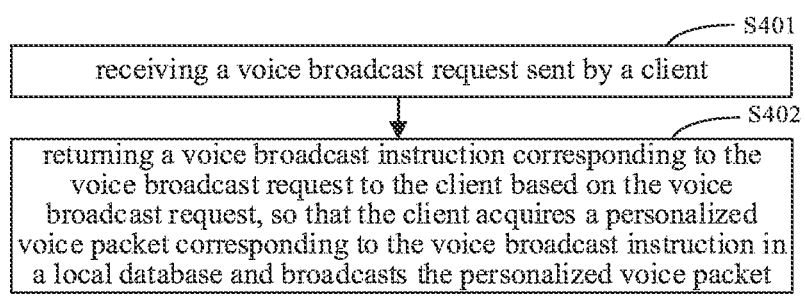
FIG. 4 is a third flowchart of a method for broadcasting the voice according to an embodiment of the present disclosure.

FIG. 4 is a third flowchart of the method for broadcasting the voice according to an embodiment of the present disclosure. On the basis of the previous embodiment, this embodiment of the present disclosure applies the method for broadcasting the voice to a server to explain the process of the voice broadcast. As shown in FIG. 4, the method of this embodiment includes, but is not limited to, the following steps S401 to S402.

S401 includes receiving a voice broadcast request sent by a client.

In a specific embodiment of the present disclosure, in a scenario of intelligent voice broadcast, the client parses the current scenario related information and sends the voice broadcast request to the server. Correspondingly, the server receives the voice broadcast request sent by the client, where the voice broadcast request includes at least one of scenario information, user information and voice packet setting information.

S402 includes returning a voice broadcast instruction corresponding to the voice broadcast request to the client based on the voice broadcast request, so that the client acquires a personalized voice packet corresponding to the voice broadcast instruction in a local database and broadcasts the personalized voice packet.

Alternatively, when a user satisfies a pre-set personalized broadcast condition, a pre-set voice broadcast instruction is sent to the client, so that the client acquires a targeted broadcast content corresponding to the pre-set voice broadcast instruction in the local database and broadcasts the targeted broadcast content; or when the user satisfies the pre-set personalized broadcast condition, a pre-stored personalized broadcast text is sent to the client, so that the client broadcasts based on the personalized broadcast text.

The technical solution provided in this embodiment solves the problem that the broadcast system easily makes users feel that the products are very rigid and not flexible enough and thus causes poor user experiences by realizing the voice broadcast function at the server, thereby achieving the consistency, association and diversity effects of the voice broadcast.

Embodiment 4

Figure 5:
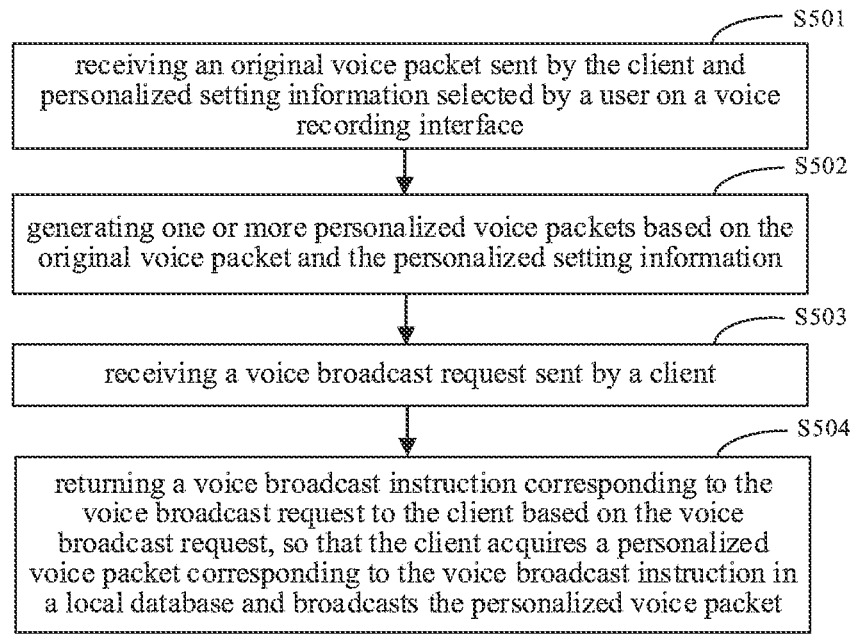
FIG. 5 is a fourth flowchart of the method for broadcasting the voice according to an embodiment of the present disclosure.

FIG. 5 is a fourth flowchart of the method for broadcasting the voice according to an embodiment of the present disclosure. On the basis of the previous embodiment, this embodiment of the present disclosure applies the method for broadcasting the voice to the server. Alternatively, this embodiment will explain the process of the voice broadcast in detail. As shown in FIG. 5, the method of this embodiment includes, but is not limited to, the following steps S501 to S504.

S501 includes receiving an original voice packet sent by the client and personalized setting information selected by a user on a voice recording interface.

In a specific embodiment of the present disclosure, the user sets some personalized information on the voice recording interface, and the client sends the original voice packet and the personalized information selected by the user on the voice recording interface to the server. The server receives the original voice packet and the personalized setting information selected by the user on the voice recording interface sent by the client.

S502 includes generating one or more personalized voice packets based on the original voice packet and the personalized setting information.

In a specific embodiment of the present disclosure, the server generates the one or more personalized voice packets based on the original voice packet and the personalized setting information, where the personalized setting information includes at least one of an effective scenario, a broadcast style or a broadcast title.

S503 includes receiving a voice broadcast request sent by the client.

S504 includes returning a voice broadcast instruction corresponding to the voice broadcast request to the client based on the voice broadcast request, so that the client acquires a personalized voice packet corresponding to the voice broadcast instruction in a local database and broadcasts the personalized voice packet.

Alternatively, a weight coefficient corresponding to a candidate voice packet is adjusted based on the original voice packet and pre-stored historical broadcast information of the user.

In a specific embodiment of the present disclosure, in order to achieve the purpose of maintaining the consistency, continuity and association of the voice broadcast content, the broadcast information in the current session of the user is first acquired, and some to-be-broadcast candidate personalized voice packets are selected for the first time, and then, according to the historical broadcast information at the client, a series of weight coefficients are generated by performing strategies, such as broadcast de-duplication, continuity check or scenario alignment, and these to-be-broadcast candidate personalized voice packets are re-selected.

Alternatively, an optimal candidate voice packet is calculated based on the weight coefficient corresponding to the candidate voice packet and the optimal candidate voice packet is used as a voice packet corresponding to the personalized setting information of the user.

In a specific embodiment of the present disclosure, according to the generated series of weight coefficients, a weight calculation is performed on each candidate to-be-broadcast personalized voice packet, and it finally takes effect on the candidate personalized broadcast content, and the corresponding broadcast content is sorted, and the personalized voice packet corresponding to the broadcast content sorted as top 1 is sent to the broadcast control module of the APP as the optimal voice packet, and the corresponding identification thereof is the voice broadcast instruction corresponding to the voice broadcast request.

Figure 6:
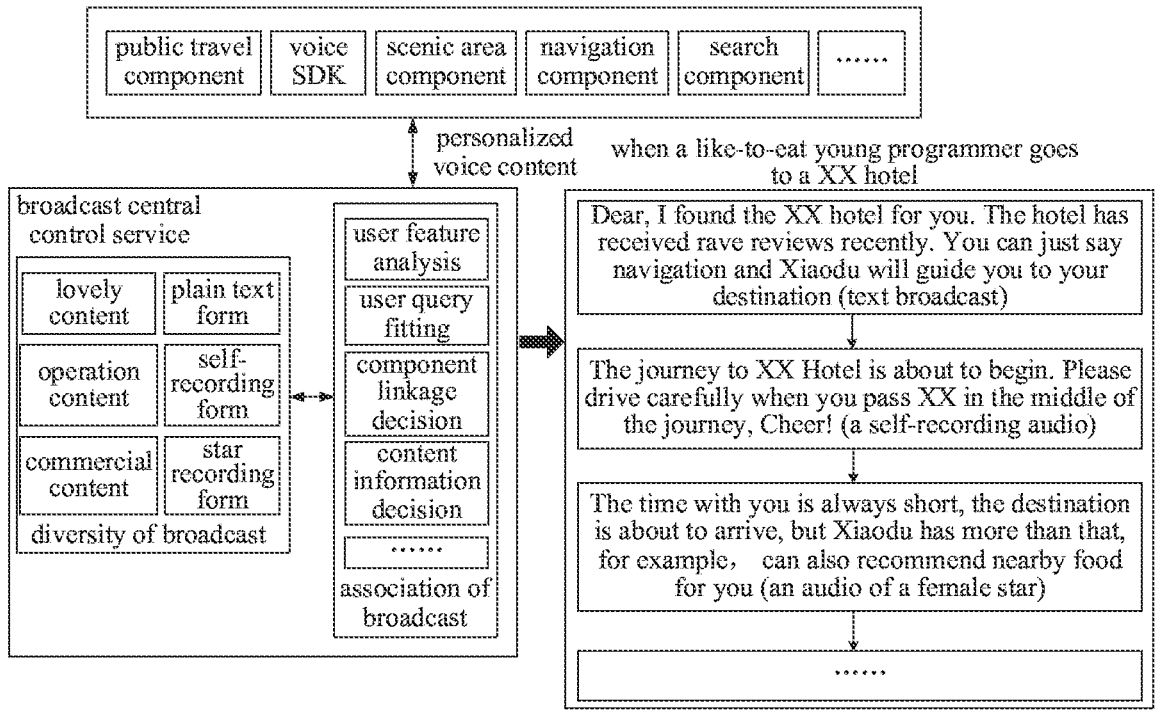
FIG. 6 is a schematic diagram of consistency, association and diversity of voice broadcast according to an embodiment of the present disclosure.

FIG. 6 is a schematic diagram of consistency, association and diversity of voice broadcast according to an embodiment of the present disclosure. As shown in FIG. 6, the overall process of the consistency, association and diversity of the voice broadcast will be explained below in detail.

In a specific embodiment of the present disclosure, the client may be provided with various components, such as a public travel component, a voice SDK, a scenic area component, a navigation component, a search component and a broadcast central control service, respectively, which may reflect the consistency, association and diversity of the voice broadcast. In the broadcast central control service, the diversity of the broadcast is reflected by setting the contents or text forms of various voice broadcast, including a lovely content, a plain text form, a operation content, a self-recording forms, a commercial content, a star recording form and the like. The association of the voice broadcast is reflected by setting various features, including user feature analysis, user query fitting, component linkage decision, content information decision and the like. For example, when a like-to-eat young programmer goes to a XX hotel, the voice broadcast selects user-satisfied voice broadcast prompts through personalized voice packets set by the user and the above components.

The technical solution provided in this embodiment solves the problem that the broadcast system easily makes users feel that the products are very rigid and not flexible enough and thus causes poor user experiences by realizing the voice broadcast function at the server and setting various components in the broadcast control module of the APP, thereby achieving the consistency, association and diversity effects of the voice broadcast.

Embodiment 5

Figure 7:
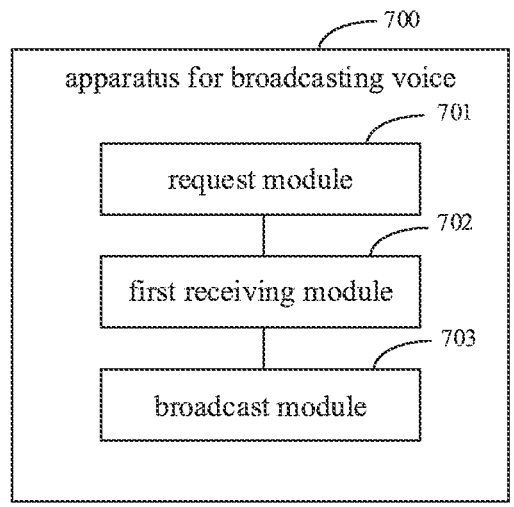
FIG. 7 is a first schematic structural diagram of an apparatus for broadcasting the voice according to an embodiment of the present disclosure.

FIG. 7 is a first schematic structural diagram of an apparatus for broadcasting the voice according to an embodiment of the present disclosure. As shown in FIG. 7, the apparatus 700 may includes a request module 701, a first receiving module 702 and a broadcast module 703.

The request module 701 is configured to send a voice broadcast request to a server, where the voice broadcast request includes at least one of scenario information, user information or voice packet setting information.

The first receiving module 702 is configured to receive a voice broadcast instruction corresponding to the voice broadcast request returned by the server.

The broadcast module 703 is configured to acquire a personalized voice packet corresponding to the voice broadcast instruction in a local database and broadcast the personalized voice packet.

Further, the apparatus includes a recording module 704 (not shown) configured to acquire an original voice packet recorded by a user on a voice recording interface and send the original voice packet and personalized setting information selected by the user on the voice recording interface to the server, so that the server generates one or more personalized voice packets based on the original voice packet and the personalized setting information, where the personalized setting information includes at least one of an effective scenario, a broadcast style or a broadcast title.

Further, the apparatus includes a storage module 705 (not shown) configured to: receive a network address of the one or more personalized voice packets returned by the server; obtain the one or more personalized voice packets in a compressed file form based on the network address of the one or more personalized voice packets; and obtain the one or more personalized voice packets based on the one or more personalized voice packets in the compressed file form and store the one or more personalized voice packets into the local database.

Further, the broadcast module 703 is configured to: search, in response to the voice broadcast instruction, for an audio ID corresponding to the voice broadcast instruction in the local database; and acquire, if the audio ID corresponding the voice broadcast instruction is found in the local database, the personalized voice packet corresponding to the voice broadcast instruction in the local database based on the audio ID.

The apparatus for broadcasting the voice may execute the method according to embodiment 1 or embodiment 2 of the present disclosure, and has functional modules and beneficial effects corresponding to the executed method. The technical details are not described in detail in this embodiment, and may refer to the method for broadcasting the voice according to embodiment 1 or embodiment 2 of the present disclosure.

Embodiment 6

Figure 8:
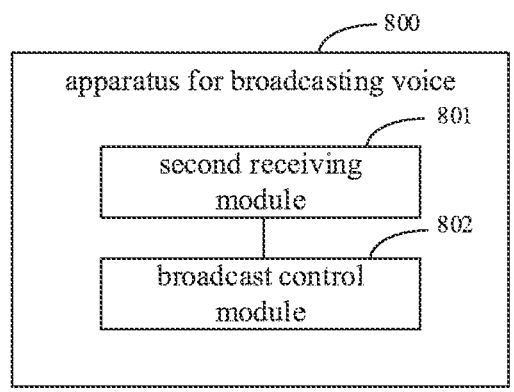
FIG. 8 is a second schematic structural diagram of the apparatus for broadcasting the voice according to an embodiment of the present disclosure.

FIG. 8 is a second schematic structural diagram of the apparatus for broadcasting the voice according to an embodiment of the present disclosure. As shown in FIG. 8, the apparatus 800 may include a second receiving module 801 and a broadcast control module 802.

The second receiving module 801 is configured to receive a voice broadcast request sent by a client, where the voice broadcast request includes at least one of scenario information, user information or voice packet setting information.

The broadcast control module 802 is configured to return a voice broadcast instruction corresponding to the voice broadcast request to the client based on the voice broadcast request, so that the client acquires a personalized voice packet corresponding to the voice broadcast instruction in a local database and broadcasts the personalized voice packet.

Further, the apparatus includes a generation module 803 configured to: receive an original voice packet and personalized setting information selected by a user on a voice recording interface sent by the client; and generate one or more personalized voice packets based on the original voice packet and the personalized setting information, where the personalized setting information includes at least one of an effective scenario, a broadcast style or a broadcast title.

Further, the generation module 803 is configured to: adjust a weight coefficient corresponding to a candidate voice packet based on the original voice packet and pre-stored historical broadcast information of the user; and calculate an optimal candidate voice packet based on the weight coefficient corresponding to the candidate voice packet and use the optimal candidate voice packet as a voice packet corresponding to the personalized setting information of the user.

Further, the broadcast control module is configured to: send, when a user satisfies a pre-set personalized broadcast condition, a pre-set voice broadcast instruction to the client, so that the client acquires a targeted broadcast content corresponding to the pre-set voice broadcast instruction in the local database and broadcasts the targeted broadcast content; or send, when a user satisfies a pre-set personalized broadcast condition, a pre-stored personalized broadcast text to the client, so that the client broadcasts based on the personalized broadcast text.

The apparatus for broadcasting the voice may execute the method according to embodiment 3 or embodiment 4 of the present disclosure, and has functional modules and beneficial effects corresponding to the executed method. The technical details are not described in detail in this embodiment, and may refer to the method for broadcasting the voice according to embodiment 3 or embodiment 4 of the present disclosure.

Embodiment 7

According to an embodiment of the present disclosure, the present disclosure further provides an electronic and a readable storage medium.

Figure 9:
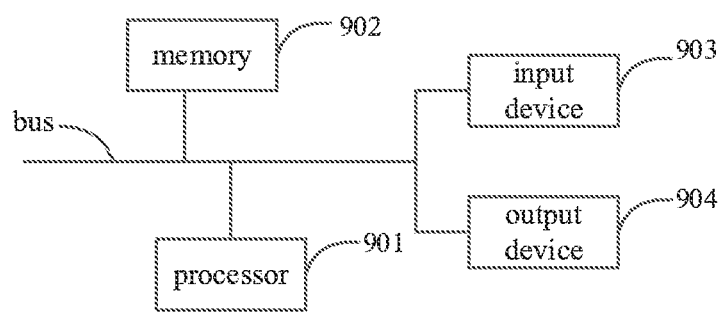
FIG. 9 is a block diagram of an electronic device adapted to implement the method for broadcasting the voice according to an embodiment of the present disclosure.

FIG. 9 is a block diagram of an electronic device adapted to implement the method for broadcasting the voice according to an embodiment of the present disclosure. The electronic device is intended to represent various forms of digital computers, such as laptops, desktops, worktables, personal digital assistants, servers, blade servers, mainframe computers and other suitable computers. The electronic device may also represent various forms of mobile devices, such as personal digital processing, cellular phones, smart phones, wearable devices and other similar computing devices. The parts, their connections and relationships, and their functions shown herein are examples only, and are not intended to limit the implementations of the present disclosure as described and/or claimed herein.

As shown in FIG. 9, the electronic device includes one or more processors 901, a memory 902 and interfaces for connecting components, including a high-speed interface and a low-speed interface. The components are interconnected by using different buses and may be mounted on a common motherboard or otherwise as required. The processor may process instructions executed within the electronic device, including instructions stored in memory or on memory to display graphical information of the GUI on an external input or output device (such as a display device coupled to an interface). In other embodiments, multiple processors and/or multiple buses and multiple memories may be used with multiple memories, if required. Similarly, multiple electronic devices may be connected (for example, used as a server array, a set of blade servers or a multiprocessor system), and the electronic device provides some of the necessary operations. An example of a processor 901 is shown in FIG. 9.

The memory 902 is a non-transitory computer readable storage medium according to the present disclosure. The memory stores instructions executable by at least one processor to cause the at least one processor to execute the method for broadcasting the voice according to the present disclosure. The non-transitory computer readable storage medium of the present disclosure stores computer instructions for causing a computer to execute the method for broadcasting the voice according to the present disclosure.

As a non-transitory computer readable storage medium, the memory 902 may be used to store non-transitory software programs, non-transitory computer executable programs and modules, such as the program instructions or modules corresponding to the method for broadcasting the voice in the embodiment of the present disclosure (such as the request module 701, the first receiving module 702 and the broadcast module 703 in the apparatus for broadcasting the voice). The processor 901 runs the non-transitory software programs, instructions and modules stored in the memory 902 to execute various functional applications and data processing of the server, thereby implementing the method for broadcasting the voice in the embodiment of the method.

The memory 902 may include a storage program area and a storage data area, where the storage program area may store an operating system and an application program required by at least one function; and the storage data area may store data created by the electronic device when executing the method for broadcasting the voice. In addition, the memory 902 may include a high-speed random access memory, and may further include a non-transitory memory, such as at least one magnetic disk storage device, a flash memory or other non-transitory solid state storage devices. In some embodiments, the memory 902 may alternatively include a memory disposed remotely relative to the processor 901, which may be connected through a network to the electronic device adapted to execute the method for broadcasting the voice. Examples of such networks include, but are not limited to, the Internet, enterprise intranets, local area networks, mobile communication networks and combinations thereof.

The electronic device adapted to execute the method for broadcasting the voice may further include an input device 903 and an output device 904. The processor 901, the memory 902, the input device 903 and the output device 904 may be interconnected through a bus or other means, and an example of a connection through a bus is shown in FIG. 9.

The input device 903 may receive input digit or character information, and generate key signal input related to user settings and functional control of the electronic device adapted to execute the method for broadcasting the voice, such as a touch screen, a keypad, a mouse, a track pad, a touch pad, a pointer bar, one or more mouse buttons, a trackball or a joystick. The output device 904 may include a display device, an auxiliary lighting device (such as an LED) and a tactile feedback device (such as a vibration motor). The display device may include, but is not limited to, a liquid crystal display (LCD), a light emitting diode (LED) display and a plasma display. In some embodiments, the display device may be a touch screen.

The various embodiments of the systems and technologies described herein may be implemented in digital electronic circuit systems, integrated circuit systems, ASICs (application specific integrated circuits), computer hardware, firmware, software and/or combinations thereof. The various embodiments may include: being implemented in one or more computer programs, where the one or more computer programs may be executed and/or interpreted on a programmable system including at least one programmable processor, and the programmable processor may be a dedicated or general-purpose programmable processor, which may receive data and instructions from a memory system, at least one input device and at least one output device, and send the data and instructions to the memory system, the at least one input device and the at least one output device.

These computing programs (also known as programs, software, software applications or code) include machine instructions of a programmable processor and may be implemented in high-level procedures and/or object-oriented programming languages, and/or assembly or machine languages. As used herein, the terms "machine readable medium" and "computer readable medium" refer to any computer program product, device and/or apparatus (such as magnetic disk, optical disk, memory and programmable logic device (PLD)) for providing machine instructions and/or data to a programmable processor, including a machine readable medium that receives machine instructions as machine readable signals. The term "machine readable signal" refers to any signal used to provide machine instructions and/or data to a programmable processor.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementation of the systems and technologies described herein), or a computing system including any combination of such background component, middleware component or front-end component. The components of the system may be interconnected by any form or medium of digital data communication (such as a communication network). Examples of communication networks include a local area network (LAN), a wide area network (WAN), the Internet and a blockchain network.

The computer system may include a client and a server. The client and the server are typically remote from each other and typically interact through a communication network. The relationship between the client and the server is generated by a computer program running on the corresponding computer and having a client-server relationship with each other. The server may be a cloud server, also known as a cloud computing server or a cloud host, which is a host product in the cloud computing service system and may solve the defects of difficult management and weak service scalability existing among a conventional physical host and a VPS (Virtual Private Server) service.

According to the technical solutions of the present disclosure, the voice broadcast request is sent to the server, where the voice broadcast request includes at least one of the scenario information, the user information or the voice packet setting information, and the voice broadcast instruction corresponding to the voice broadcast request returned by the server is received, and the personalized voice packet corresponding to the voice broadcast instruction is acquired in the local database and the personalized voice packet is broadcast. According to the embodiments of the present disclosure, users can obtain personalized voice broadcast experiences in multiple scenarios, thereby improving the user satisfaction with voice broadcast.

It should be appreciated that the steps of reordering, adding or deleting may be executed using the various forms shown above. For example, the steps described in the present disclosure may be executed in parallel or sequentially or in a different order, so long as the expected results of the technical solutions provided in the present disclosure may be realized, and no limitation is imposed herein.

The above specific implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for broadcasting a voice, applied to a client, the method comprising:
    sending a voice broadcast request to a server, wherein the voice broadcast request comprises at least one of scenario information, user information or voice packet setting information;
    receiving a voice broadcast instruction corresponding to the voice broadcast request returned by the server;
    acquiring a personalized voice packet corresponding to the voice broadcast instruction in a local database and broadcasting the personalized voice packet:
    providing options on a given voice recording interface, wherein the options comprise an option of a voice recording, and an option of a scenario;
    acquiring an original voice packet recorded by a user on the given voice recording interface; and
    enabling the original voice packet to be broadcasted when the client is in the scenario, by selecting the option of the scenario.

2. The method according to claim 1, the method further comprising:
receiving a network address of the one or more personalized voice packets returned by the server;
obtaining the one or more personalized voice packets in a compressed file form based on the network address of the one or more personalized voice packets; and
obtaining the one or more personalized voice packets based on the one or more personalized voice packets in the compressed file form and storing the one or more personalized voice packets into the local database.

3. The method according to claim 1, the acquiring the personalized voice packet corresponding to the voice broadcast instruction in the local database comprising:
searching, in response to the voice broadcast instruction, for an audio ID corresponding to the voice broadcast instruction in the local database; and
acquiring, if the audio ID corresponding the voice broadcast instruction is found in the local database, the personalized voice packet corresponding to the voice broadcast instruction in the local database based on the audio ID.

4. The method according to claim 1, wherein the scenario is a place, and acquiring the personalized voice packet corresponding to the voice broadcast instruction in the local database and broadcasting the personalized voice packet comprises: determining, by a positioning device of the client, a location of the client; acquiring the original voice packet recorded by the user when the client is at the place; and broadcasting the original voice packet.

5. A non-transitory computer readable storage medium storing computer instructions, wherein the computer instructions cause a computer to execute the method according to claim 1.

6. A method for broadcasting a voice, applied to a server, the method comprising:
receiving a voice broadcast request sent by a client, wherein the voice broadcast request comprises at least one of scenario information, user information or voice packet setting information;
returning a voice broadcast instruction corresponding to the voice broadcast request to the client based on the voice broadcast request, so that the client acquires a personalized voice packet corresponding to the voice broadcast instruction in a local database and broadcasts the personalized voice packet;
receiving an original voice packet recorded by a user on a given voice recording interface, wherein options are provided on the given voice recording interface, wherein the options comprise an option of a voice recording, and an option of a scenario; and
enabling the original voice packet to be broadcasted when the client is in the scenario, by determining that the option of the scenario is selected.

7. The method according to claim 6, the method further comprising:
adjusting a weight coefficient corresponding to a candidate voice packet based on the original voice packet and pre-stored historical broadcast information of the user; and
calculating an optimal candidate voice packet based on the weight coefficient corresponding to the candidate voice packet and using the optimal candidate voice packet as a voice packet corresponding to the personalized setting information of the user.

8. The method according to claim 6, the method further comprising:

sending, when a user satisfies a pre-set personalized broadcast condition, a pre-set voice broadcast instruction to the client, so that the client acquires a targeted broadcast content corresponding to the pre-set voice broadcast instruction in the local database and broadcasts the targeted broadcast content; or
sending, when the user satisfies the pre-set personalized broadcast condition, a pre-stored personalized broadcast text to the client, so that the client broadcasts based on the personalized broadcast text.

9. The method according to claim 6, wherein the scenario is a place, and returning the voice broadcast instruction corresponding to the voice broadcast request to the client based on the voice broadcast request comprises: determining that the client is located at the place; and returning the original voice packet to the client for broadcasting.

10. An electronic device, comprising:
at least one processor; and
a memory in communication with the at least one processor, wherein the memory stores instructions executable by the at least one processor, and the instructions, when executed by the at least one processor, cause the at least one processor to perform the method according to claim 6.

11. A non-transitory computer readable storage medium storing computer instructions, wherein the computer instructions cause a computer to execute the method according to claim 6.

12. An electronic device, comprising:
at least one processor; and
a memory in communication with the at least one processor, wherein the memory stores instructions executable by the at least one processor, and the instructions, when executed by the at least one processor, cause the at least one processor to perform operations comprising:
sending a voice broadcast request to a server, wherein the voice broadcast request comprises at least one of scenario information, user information or voice packet setting information;
receiving a voice broadcast instruction corresponding to the voice broadcast request returned by the server;
acquiring a personalized voice packet corresponding to the voice broadcast instruction in a local database and broadcasting the personalized voice packet;
providing options on a given voice recording interface, where the options comprise an option of a voice recording, and an option of a scenario;
acquiring an original voice packet recorded by a user on the given voice recording interface; and
enabling the original voice packet to be broadcasted when the client is in the scenario, by selecting the option of the scenario.

13. The electronic device according to claim 12, wherein the operations further comprise:
receiving a network address of the one or more personalized voice packets returned by the server;
obtaining the one or more personalized voice packets in a compressed file form based on the network address of the one or more personalized voice packets; and
obtaining the one or more personalized voice packets based on the one or more personalized voice packets in the compressed file form and storing the one or more personalized voice packets into the local database.

14. The electronic device according to claim 12, the acquiring the personalized voice packet corresponding to the voice broadcast instruction in the local database comprising:

searching, in response to the voice broadcast instruction, for an audio ID corresponding to the voice broadcast instruction in the local database; and acquiring, if the audio ID corresponding the voice broadcast instruction is found in the local database, the personalized voice packet corresponding to the voice broadcast instruction in the local database based on the audio ID.

\* \* \* \* \*